(12) United States Patent  
Van-Thournout et al.

(10) Patent No.: US 6,994,399 B2  
(45) Date of Patent: Feb. 7, 2006

(54) SEAT BACK SUSPENSION ARRANGEMENT

(75) Inventors: Olivier Freddy Van-Thournout, Lauwe (BE); Filip Alida Eggermont, Otegem (BE); Stefaan Deceuninck, Menen (BE)

(73) Assignee: L&P Swiss Holding Company, Wittenbach (CH)

( * ) Notice: Subject to any disclaimer, the term of this patent is extended or adjusted under 35 U.S.C. 154(b) by 0 days.

(21) Appl. No.: 10/497,095

(22) PCT Filed: Nov. 28, 2002

(86) PCT No.: PCT/EP02/13452

§ 371 (c)(1),  
(2), (4) Date: Oct. 7, 2004

(87) PCT Pub. No.: WO03/045732

PCT Pub. Date: Jun. 5, 2003

(65) Prior Publication Data

US 2005/0040686 A1    Feb. 24, 2005

(30) Foreign Application Priority Data

Nov. 28, 2001  (GB) .................................... 0128417  
Nov. 26, 2002  (GB) .................................... 0227534

(51) Int. Cl.  
*B60N 2/427*  (2006.01)  
*B60R 21/00*  (2006.01)

(52) U.S. Cl. ............................... 297/284.4; 297/216.1; 297/216.13; 297/216.14; 297/452.54; 297/452.63

(58) Field of Classification Search ............. 297/284.4, 297/216.13, 216.14, 452.63, 216.1, 452.54  
See application file for complete search history.

(56) References Cited

U.S. PATENT DOCUMENTS

| 3,627,379 | A | * | 12/1971 | Faust ....................... 297/284.4 |
| 4,368,917 | A | * | 1/1983 | Urai ....................... 297/452.54 |
| 5,769,489 | A | * | 6/1998 | Dellanno ............... 297/216.14 |
| 5,823,620 | A | * | 10/1998 | Le Caz .................... 297/284.4 |
| 6,062,642 | A | * | 5/2000 | Sinnhuber et al. ..... 297/216.13 |

(Continued)

FOREIGN PATENT DOCUMENTS

EP    0 128 407    12/1984

(Continued)

*Primary Examiner*—Rodney B. White  
(74) *Attorney, Agent, or Firm*—Grant D. Kang; Dennis JM Donahue, III; Husch & Eppenberger LLC

(57) ABSTRACT

A seat suspension arrangement intended to provide greater protection for occupants of a vehicle seat in the event of a rearward collision in a motor vehicle, comprises a platform element intended to be supported in the frame of the back rest of a vehicle seat in order to provide support for the seat upholstery, the platform element comprising side rails (1) between which are coupled sinuous wire springs (3) and a plurality of link means (6, 300, 301, 302) by means of which the platform element may be suspended in the frame of a vehicle seat. At least some of the link means (300, 301, 302) are designed to collapse under abnormal load such as would occur in a vehicle collision from the rear, to allow the platform element to move relatively to the seat frame and thus to provide protection for the seat occupant against rearward impact.

22 Claims, 9 Drawing Sheets

U.S. PATENT DOCUMENTS

| | | | |
|---|---|---|---|
| 6,086,097 A * | 7/2000 | Van Wynsberghe | 297/216.1 X |
| 6,152,531 A * | 11/2000 | Deceuninck | 297/284.4 |
| 6,520,577 B2 * | 2/2003 | Kitagawa | 297/216.13 |
| 6,601,919 B1 * | 8/2003 | Deceuninck | 297/284.4 |
| 6,755,476 B2 * | 6/2004 | Kawashima et al. | 297/284.4 X |
| 2003/0085600 A1 * | 5/2003 | Mori | 297/284.4 |
| 2004/0140705 A1 * | 7/2004 | McMillen et al. | 297/284.4 X |

FOREIGN PATENT DOCUMENTS

| | | | | |
|---|---|---|---|---|
| EP | 420824 A1 * | 4/1991 | | 297/284.4 |

\* cited by examiner

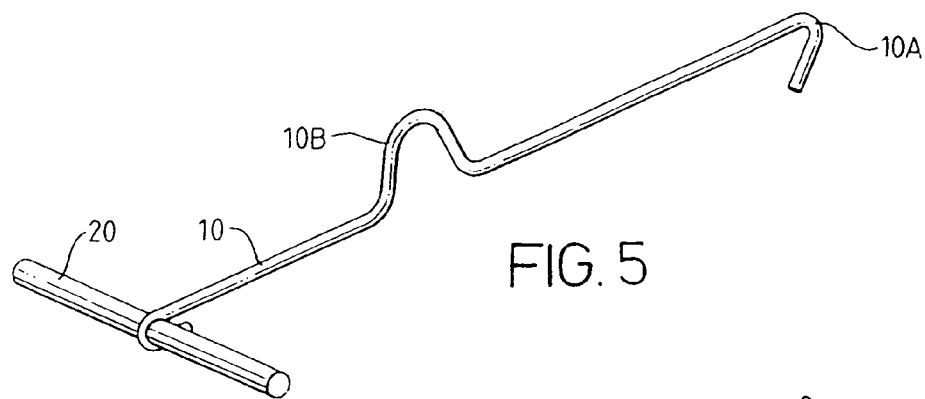
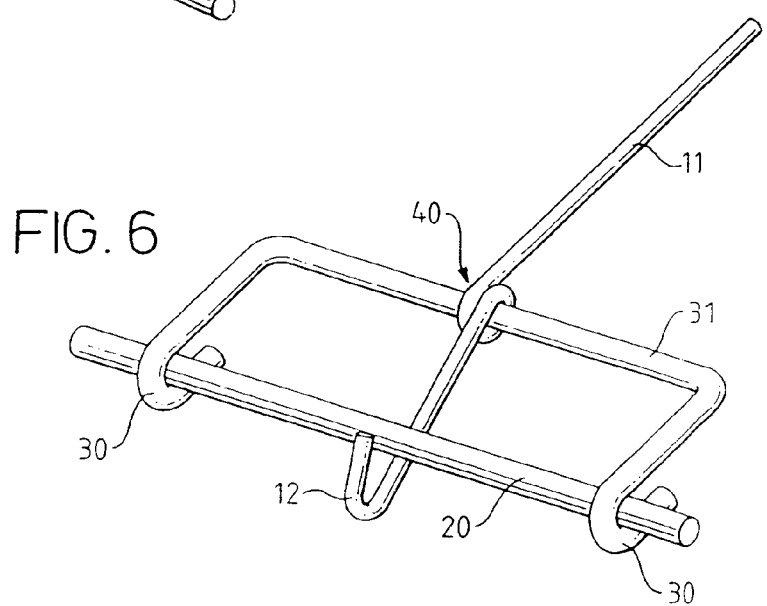
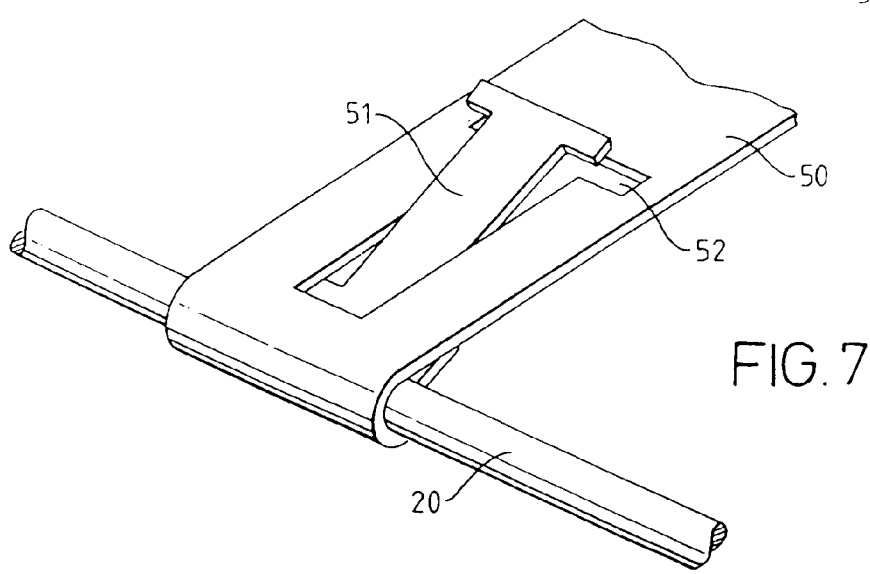

SEAT BACK SUSPENSION ARRANGEMENT

CROSS-REFERENCE TO RELATED APPLICATIONS

This application claims priority to PCT/EP02/13452 filed on Nov. 28, 2002; which claims priority to Great Britain Patent 0227534.5 filed Nov. 26, 2002; which claims priority to Great Britain Patent 0128417 filed Nov. 28, 2001.

BACKGROUND OF THE INVENTION

1. Field of the Invention

This invention relates to an improved seat suspension arrangement, more especially of the kind intended for use in the backrest of a vehicle seat.

2. Related Art

In the vehicle seat, it is well known to provide support for the upholstery of the seat by means of a platform element that is suspended between two opposite side elements of a seat frame in such a manner as to provide resilient support for the upholstery. Arrangements are known in which the platform element is flexible but substantially inextensible, and wherein tension springs are provided to support the platform element between the side elements of the seat frame. Other arrangements are known wherein the platform element itself is resiliently extensible in a transverse direction, and in that case the platform element can be attached to side elements of the seat frame by link means that are substantially inextensible. Platform elements of the latter kind are known, for example, from EP-A-0128407 (see FIG. 2) and GB-A-2316604 (see FIG. 1).

Safety requirements in relation to vehicle seats become increasingly more rigorous, and thus, in the design of vehicle seats, those skilled in the art are constantly seeking measures that may be adopted in order to reduce personal injury that may occur to occupants of the seats in the event of a motor vehicle accident.

It has, for example, been proposed that the frames of vehicle seats should be adapted to allow a limited collapse in the event of the application of sudden loads exceeding those occurring in normal use, in order, for example, to reduce injury to an occupant due to sudden forward acceleration of the seat. This may occur, for example, if a motor vehicle is subjected to a sudden impact from the rear when a following vehicle collides therewith.

Arrangements for providing for the collapse of vehicle seat frames, are, however, of complicated construction and are thus relatively expensive.

Other arrangements for collapse of seat suspension assemblies have also been proposed but are also relatively complicated, see for example WO 99/29536

SUMMARY OF THE INVENTION

It is an object of the present invention to provide a simplified means that will enable the occupant of a vehicle seat to be cushioned from a sudden forward acceleration applied to the vehicle seat frame, for example as a result of a collision.

The invention provides a seat suspension arrangement comprising: a seat back platform element having a side margin; and a collapsible extensible link means connected to the side margin, the link means substantially restraining the side margin from displacement during normal loading conditions and yielding under abnormal loading conditions.

BRIEF DESCRIPTION OF THE DRAWINGS

Further preferred features and attendant advantages of the invention will become apparent from the following description taken in conjunction with the accompanying drawings, in which, FIG. 5 is a perspective view showing one example of a link means for securing a platform element to a seat frame in accordance with the present invention, FIGS. 6–10 are similar views of alternative forms of link means.

Referring to FIG. 1, which illustrates an arrangement as shown in GB-A-2316604, it will be seen that a platform element comprises a pair of side rails 1 interconnected by a plurality of transverse supporting wires 3 that are angled at 3A so that they form sinuous wire springs allowing for limited transverse stretching of the platform element. The arrangement of the sinuous wire springs may, for example, be such that they can be extended to a point at which the wires adopt almost a straight line under the maximum load normally expected upon the seat. At this point the platform element will be resistant to further resilient extension, and forces placed on the platform element will be transmitted directly to wire links 6 coupling the platform element to a seat frame 5. In a known vehicle seat, the system presented by the platform element and the wire links securing it to the seat frame will present a substantially rigid and inextensible system and will thus transfer to the occupant of the seat any abnormal force of acceleration such as may occur as a result of an impact upon the motor vehicle from the rear.

The effect of an impact from the rear on the occupant of a vehicle seat of conventional construction is illustrated diagrammatically in FIGS. 2 and 3. FIG. 2 shows the posture of an occupant of a vehicle seat when seated in a normal travelling position. For simplicity, there is shown in the drawing only a back rest 200 of the vehicle seat, that, in known manner, will incorporate the seat frame and platform element of an arrangement as shown in FIG. 1, the platform element itself being illustrated diagrammatically at 201. As illustrated in FIG. 2, an angle u1 is defined between the axis 202 of the upper legs of the occupant and the spine 203.

As illustrated in FIG. 3, in the event of a vehicle collision involving an impact from the rear, the seat back will collapse into the position shown in FIG. 3, the seat back 200 and the platform element 201 being forced backwardly and effectively pivoting rearwardly about the base of the seat. This has the result that there is a sudden increase in the angle between the legs and the spine of the seat occupant that will cause potential injury. An object of the arrangement according to a preferred embodiment of the invention is to allow a controlled collapse of the platform element relatively to the seat frame in such a manner as to avoid such a sudden change in the posture of the occupant of a seat. As shown in FIG. 4, it would be desirable that, in the event of a vehicle collision, the back rest 200 of the vehicle seat on the one hand, and the platform element 201 on the other be allowed to collapse in different directions, in order to enable the torso of the occupant of the seat to be cushioned in rearward movement, without substantially changing the relative positions of the legs and spine of the occupant of the seat. Thus, as shown in FIG. 4, although the back rest 200 has been forced rearwardly into a reclining position, the platform element 201 has moved rearwardly relatively to the seat back 200 in such a manner that whereas the upper portion of the platform element has moved rearwardly through a distance shown as d1, the lower part of the platform element has moved through a greater distance d2 so that the attitude of the platform element relatively to the legs of the occupant of the seat remains substantially unchanged.

Figure 1:
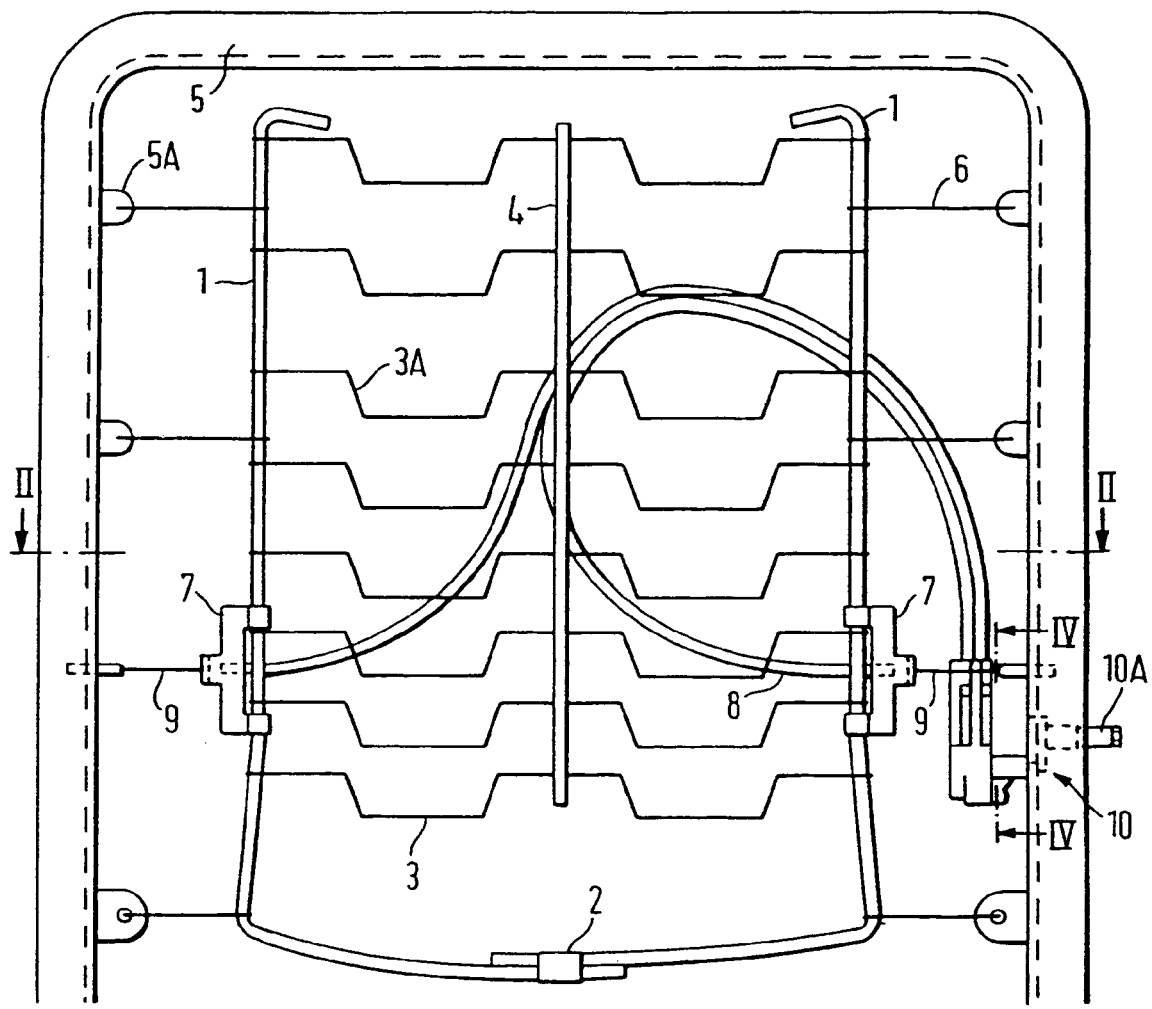
FIG. 1 is a front elevation of a seat back rest incorporating an arrangement of known type referred to above.
Figure 2:
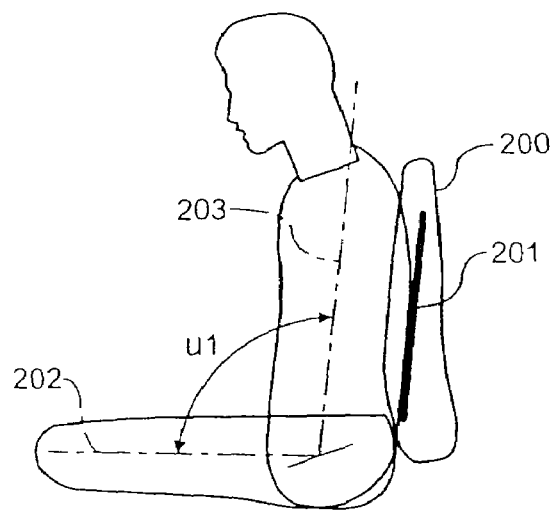
FIG. 2 is a diagrammatic view illustrating an occupant of a vehicle seat shown in the normal seated position.
Figure 3:
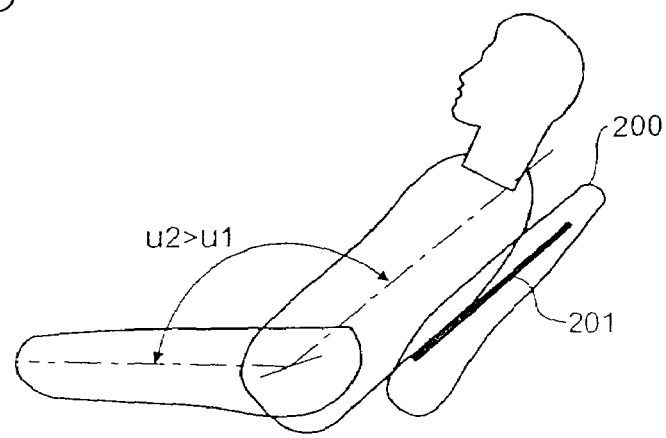
FIG. 3 is a view similar to FIG. 2 but showing the occupant of a conventional vehicle seat in a position that would normally occur after the vehicle has been involved in a collision from the rear.

As will be described below, this object can be achieved by replacing the known wire links 6 of the conventional construction shown in FIG. 1 by means of modified link means that are capable of extension under abnormal load.

DETAILED DESCRIPTION OF THE PREFERRED EMBODIMENTS

In the arrangement according to the invention, an extensible link means may take various forms and may be designed to collapse under load in such a manner that the increase in length of the link means in proportion to the applied load is either linear, or non-linear. The manner in which the platform element of the seat arrangement yields under abnormal load may thus be tailored to an optimum condition that may be determined by trial and experiment.

In FIG. 5 for example, there is a shown a wire link 10, one end of which is anchored around a side rail 20 of a platform element of the kind shown in GB-A-2316604, and the other end 10A of which is hooked for insertion in an appropriate anchorage point provided on a side member of the seat frame. Between the two ends of the wire link an intermediate portion 10B is angled to form a loop that can extend under a load determined by the material and dimensions of the wire link 10.

FIG. 6 shows another arrangement wherein the side rail 20 of the platform element is engaged by hooked ends 30 of a U-shaped wire yoke 31. A wire link 11 of which a free end is linked to seat frame in a manner not illustrated is wound around an intermediate portion of the yoke 31, as illustrated at 40, and is extended to provide a hooked end 12 that terminates in spaced relation to the side rail 20. Thus, when the platform element is placed under abnormal load, the side rail 20 is allowed to yield relatively to the seat frame until the hooked portion 12 of the wire link 11 engages the side rail 20 in order to provide additional restraint. Such yielding of the side rail 20 is allowed owing to the fact that the portion 40 of the wire 11 will unroll around the yoke 31 under tension and/or the yoke 31 itself will bend. The precise action will be dependent upon the relative diameters of the wires 11 and 31 which can be selected to give the desired result.

In the arrangement of FIG. 7, the side rail 20 is engaged by a metal strap 50 of which a free end is anchored to the seat frame in a manner not shown. The metal strap is looped around the side rail 20 and a T-shaped tongue 51 thereof is arranged to engage through a correspondingly shaped slot 52. Under abnormal load, the portion of the strap 50 that is looped around the side rail 20 can extend by unrolling of the loop in the strap 50 until the T-shaped head of the tongue 51 is trapped at the end of the slot 52.

Figure 8:
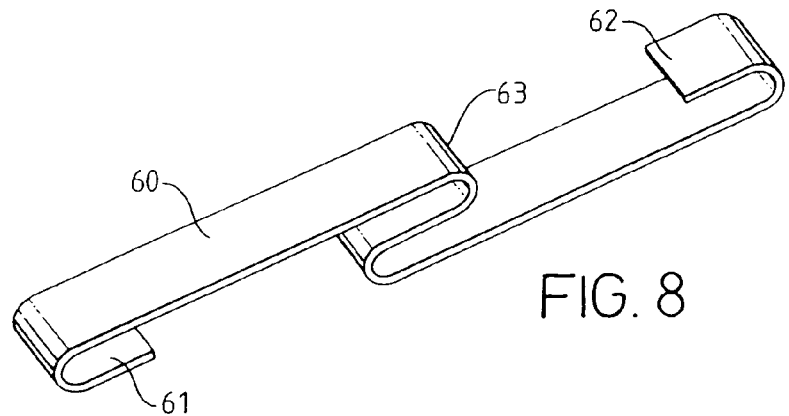

In FIG. 8, a metal strap 60 has looped ends 61 and 62 for respective engagement with the side rail of a platform element and with the frame of a seat, and incorporates an S-shaped centre portion 63 that can extend under load.

Figure 9:
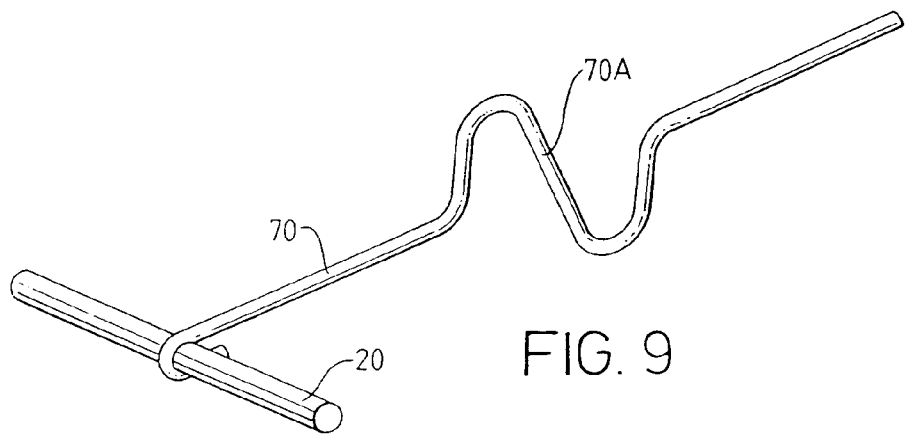

In FIG. 9, the side rail 20 is engaged by a wire link 70 that is similar to the link 10 of FIG. 5, with the exception that a looped portion 70A is of S-shaped rather than U-shaped configuration.

Figure 10:
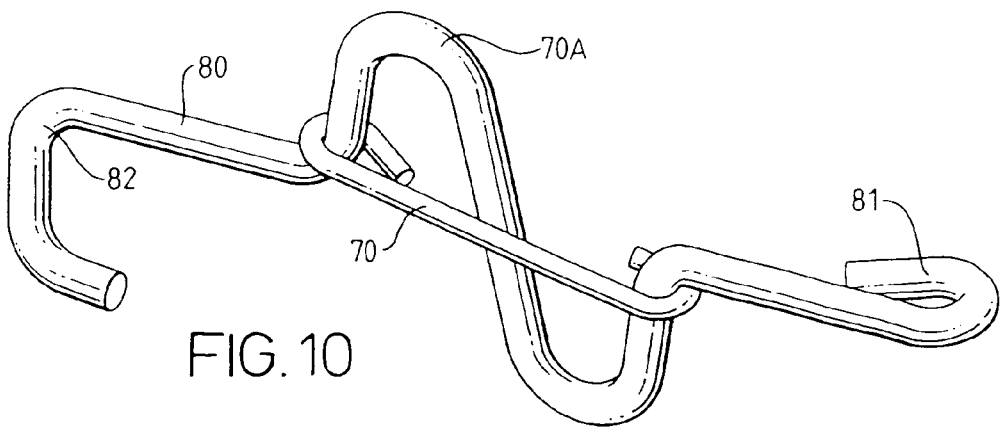
Figure 11:
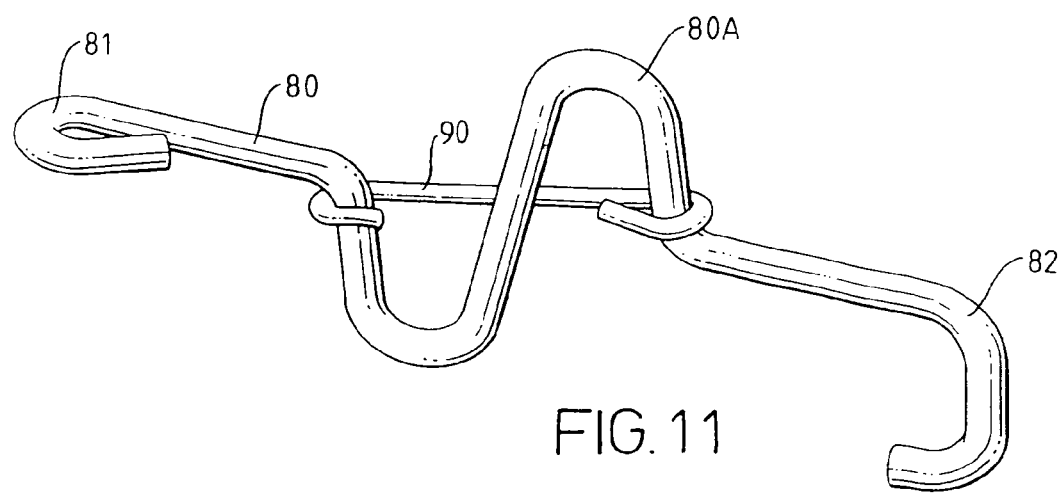
FIG. 11 is a perspective view of the links means shown in FIG. 10 taken from the opposite side.

FIGS. 10 and 11 show another arrangement wherein a wire link 80 has a looped end 81 for engagement around the side rail of a platform element, and a hooked end 82 for engagement within a seat frame. An intermediate looped portion 80A is formed in an S-shaped similar to the link of FIG. 9, but the respective ends of the S-shaped link are interconnected by a further wire link 90 that is looped around the first link 80 in the manner illustrated. This has the effect that extension of the wire link 80 is prevented until the load transmitted between the respective ends thereof is sufficient to unroll a hooked end of the interconnecting link 90 and allow the S-shaped loop to expand. This arrangement is such as to modify the relationship between the linear extension of the link 80 and the applied load, in such a manner that the load reaches a peak value at which the link 90 fails, before the link 80 is allowed to expand. Continued expansion of the link 80 then occurs. This particular characteristic is such as to allow a controlled collapse of the platform element that is believed to be particularly effective in preventing the transfer of shocks to the occupant of a seat in the event of an accidental collision.

Figure 12:
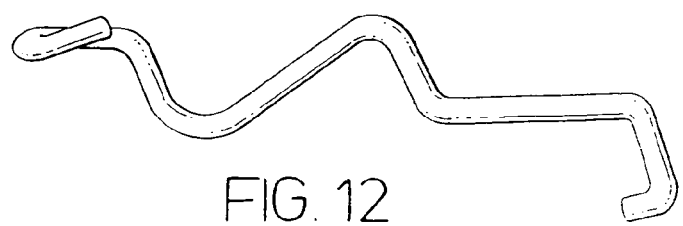
FIG. 12 is a side elevation of a link means as shown in FIG. 9 or FIGS. 10 and 11, but in a deformed state such as would occur after a vehicle has been involved in a collision from the rear.

It will be appreciated that although the deformable links referred to above may be formed of spring steel as in the case of existing links conventionally used, the deformation that is required to achieve the desired extension of the links, under abnormal load, is not resilient extension in the manner of a normal spring but is effected by plastic deformation of the material of the link beyond its yield point. FIG. 12 shows for example the permanently deformed condition of a link of the kind shown in FIGS. 9–11 after it has been subjected to an abnormal load.

Figure 13:
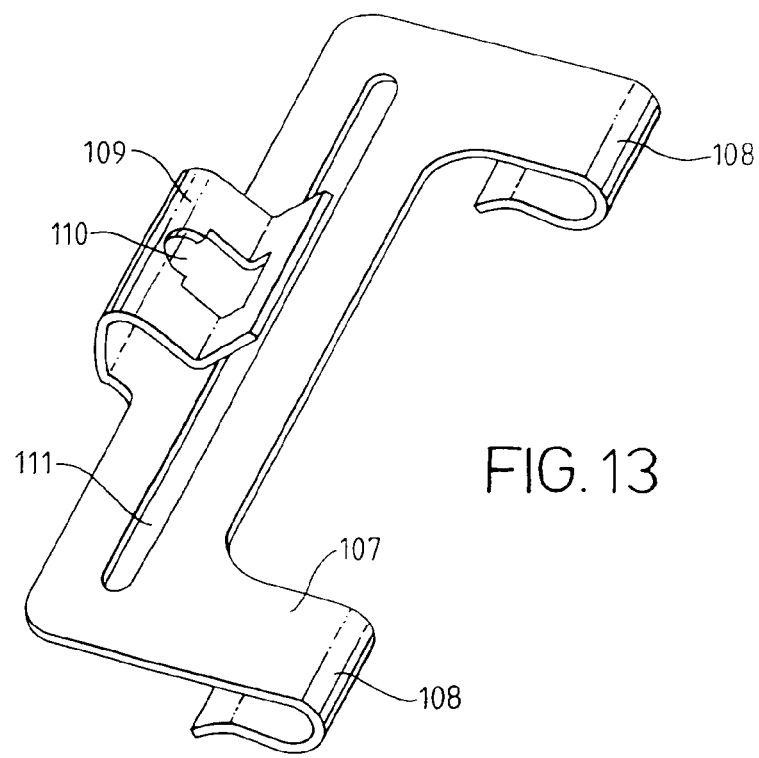
FIG. 13 is a perspective view of a link means for incorporation in a cable adjustment mechanism of a seat arrangement as shown in FIG. 1.

Referring to FIG. 13 there is shown a further embodiment of the invention that comprises a modified clip for use in the known arrangement of adjustable back rest as shown in FIG. 1. It will be seen from FIG. 1 that side rails 1 of the platform element, in addition to being linked to the seat frame 5 by means of the inextensible links 6, are further linked to the frame by means of Bowden cables, the inner cores of which are anchored to the seat frame 5 and then passed via outer sheaths 8 to an adjustment mechanism 10. The outer sheaths 10 of the Bowden cables are anchored at their free ends in clips 7 that extend around the side rails 1. This arrangement has the effect that when the inner cores 9 of the Bowden cables are subjected to tension by the adjustment mechanism 10, the free ends of the sheaths 8 are drawn towards the seat frame 5 and carry with them the clips 7 that are anchored around the side rails 1 of the platform element. Thus the transverse wires 3 of the platform element are subjected to additional tension in the lumbar region of the backrest for the purpose of providing lumbar adjustment.

In the known arrangement it would clearly be desirable to provide for controlled collapse of the means linking the side rails 1 to the seat frame 5 also in the lumbar region of the platform element, in addition to the regions supported by the links 6.

Referring to FIG. 13 it can be seen that a clip element 107 has a configuration generally similar to that of the clips 7 of FIG. 1, comprising a pair of spaced hook portions 108 for snap engagement over the side rails 1 of the platform element shown in FIG. 1, and a further hook portion 109 extending from the opposite margin of the clip and incorporating an anchorage 110 in the form of an aperture designed for engagement with an appropriately shaped mounting at the end of a sheath 8 of the Bowden cable mechanism shown in FIG. 1.

The clip 107 is thus of generally U-shaped configuration, and, in the base of the U there is provided a longitudinally extending slit 111 that forms a point of weakness. Therefore when the Bowden cable mechanism shown in FIG. 1 is placed under tension, this tension is transmitted from the seat frame 5 to the hooked portion 109 and thence to the side rail 1 of the platform element via the transversely extending base of the U and the hooked portions 108. Since the longitudinal slit 111 forms a point of weakness in the base of the U, the clip element becomes deformed under excessive load, by spreading apart of the opposite longitudinal boundaries of the slit 111, thus allowing the hooked portion 109 to yield relatively to the hooked portions 108, upon the corresponding deformation of the base of the U. Thus, a controlled yielding of the platform element can be achieved in the region in which lumbar adjustment is provided by the Bowden cables 8,9, in addition to the regions at which yielding may be allowed for by link elements as described with reference to FIGS. 5 to 11.

As already mentioned, the use of extensible links in accordance with the invention enables a suspension assembly including a platform element to be tailored to provide for a progressive deflection of the platform element under abnormal load, and by selection of appropriate forms of link means energy absorbent elements can be created that will absorb energy by extending under certain levels of force. As will be understood by one skilled in the art, tuning of the deflection characteristics of the suspension arrangement can be achieved by varying the shape of the extensible links, by varying the diameter of the wire from which such links are formed, by varying the number of links coupling the platform element to the seat frame, by varying the number of cross wires in the platform element itself and-the distance between cross wires, by providing additional link means as indicated in FIGS. 10 and 11 and by varying the diameter of the extra link means provided.

Figure 15:
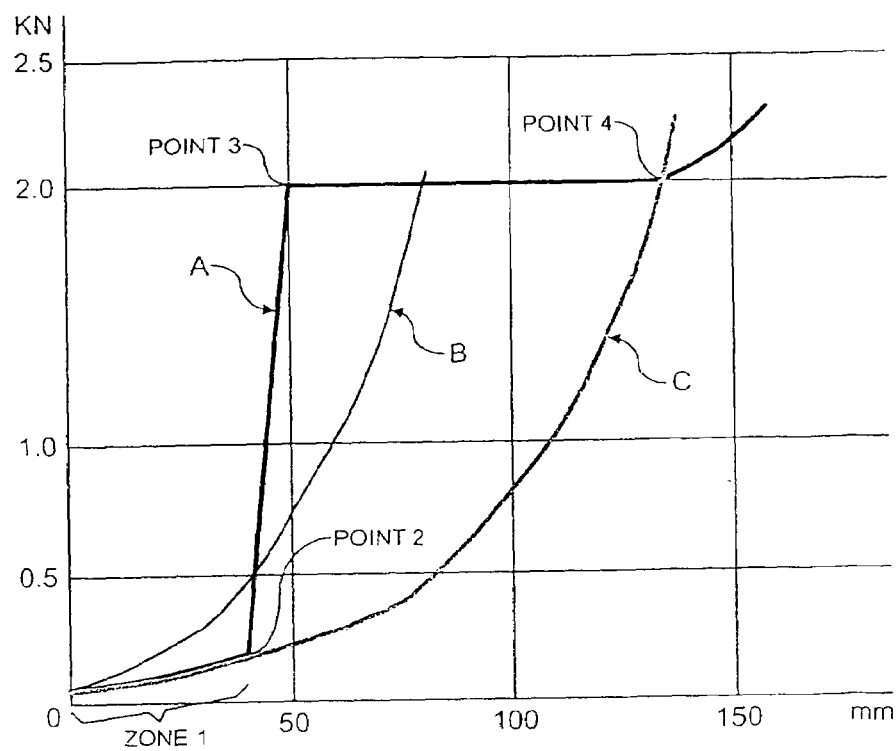
FIG. 15 is a graph showing force deflection characteristics of seat suspension arrangements under conditions of abnormal load that would occur during a vehicle collision.

Referring to FIG. 15 there is shown for comparison, force deflection curves illustrating the deflection of the platform element of a seat suspension arrangement under conditions of normal and abnormal load, wherein the applied force in kilonewtons is represented on the abscissa and the corresponding deflection of the platform element in millimeters is represented on the ordinate.

Figure 4:
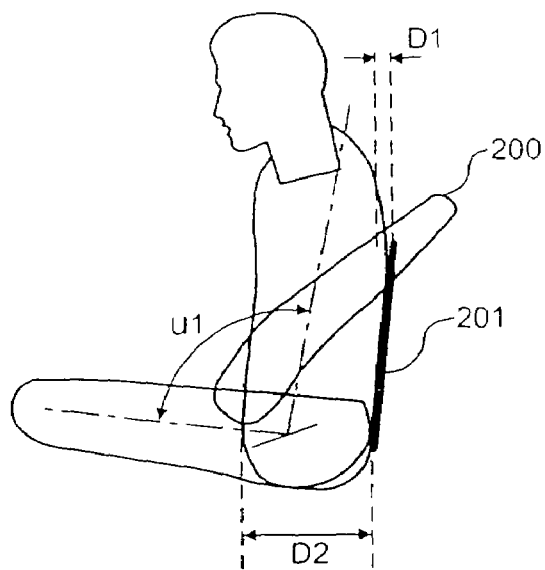
FIG. 4 is a diagrammatic view similar to FIG. 2 but showing the position of the occupant of a vehicle seat after a vehicle has been involved in a rearward collision when occupying a vehicle seat in accordance with the present invention.

The curve A represents an ideal force deflection characteristic of a vehicle seat suspension arrangement designed to collapse in the manner illustrated in FIG. 4. Thus, in a first section of the curve A extending from its origin to point 2 and indicated as zone 1, the seat assembly should have a normal resilient deflection characteristic representing the comfort zone in which forces occurring on the seat assembly in normal use are absorbed resiliently. However, in the event of a rearward collision, the force exerted upon the seat will increase rapidly in the section of the curve between point 2 and point 3. In this region, the deflection of the seat assembly should remain almost the same as force thereon increases. When the force upon the seat assembly reaches a given threshold, the seat assembly should then allow increasing deflection of the platform element whilst the force upon the seat assembly remains substantially the same, as indicated by the section of the curve A extending between points 3 and 4. In practice, it is difficult to achieve this ideal deflection characteristic. However, characteristics approximating to the ideal curve can be achieved by selection of appropriate link means positioned at relevant points on the platform element of the seat. Thus, curve B illustrates a force deflection characteristic that may be achieved when conventional link means are used in any given part of the seat, whereas curve C illustrates a curve that may be achieved when, in the same part of the seat, a platform element is linked to the seat frame by extensible links in accordance with the invention.

Figure 14:
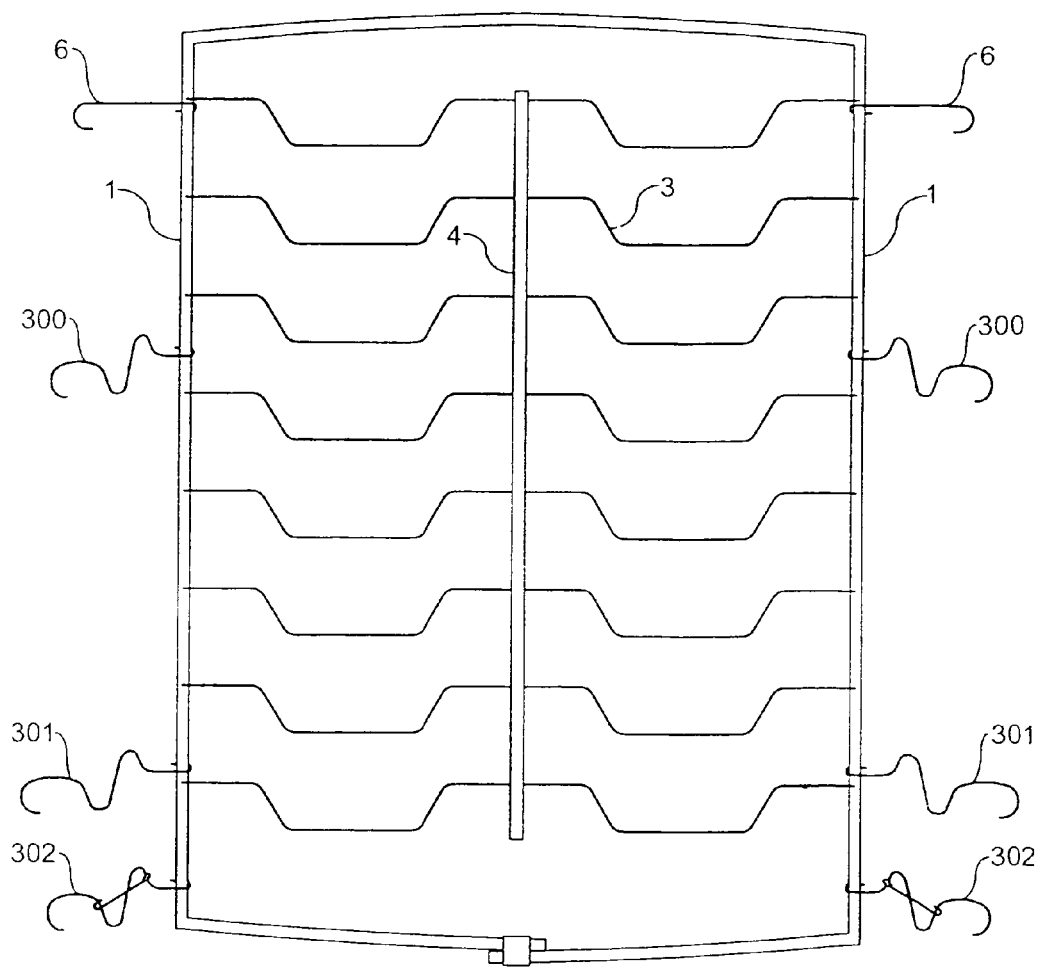
FIG. 14 is a front view of one embodiment of platform element of a seat arrangement according to the invention shown equipped with link means of kinds shown in FIGS. 9–11.

A seat assembly that is tailored to give such differing force deflection characteristics between upper, middle and lower portions of the platform element is illustrated diagrammatically in FIG. 14, wherein a platform element of the general construction shown in FIG. 1 and comprising side rails 1 interconnected by transverse supporting wires 3 is provided with link means that differ to provide different extension characteristics as desired for the respective portions of the seat assembly. Thus, for example, at the upper region of the platform element the side rails 1 are provided with the conventional linking hooks 6 of the kind that are not intended to extend significantly under abnormal loads. At middle and lower regions of the seat assembly the platform element is provided with link means 300, 301 that have the general form shown in FIG. 9 of the drawings but are tailored to provide correspondingly desired extension characteristics. At the base of the platform element, the side rails 1 are provided with link means 302 having the form shown in FIGS. 10 and 11 of the drawings.

Figure 16:
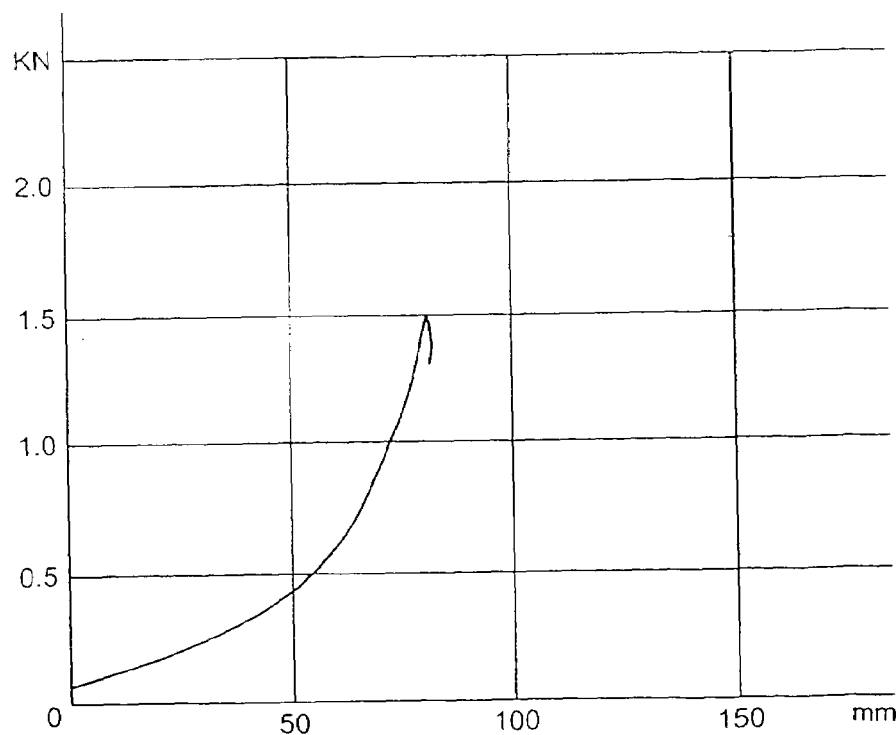
FIG. 16 is a similar view showing force deflection characteristics in the upper region of a seat suspension arrangement in accordance with the invention.
Figure 17:
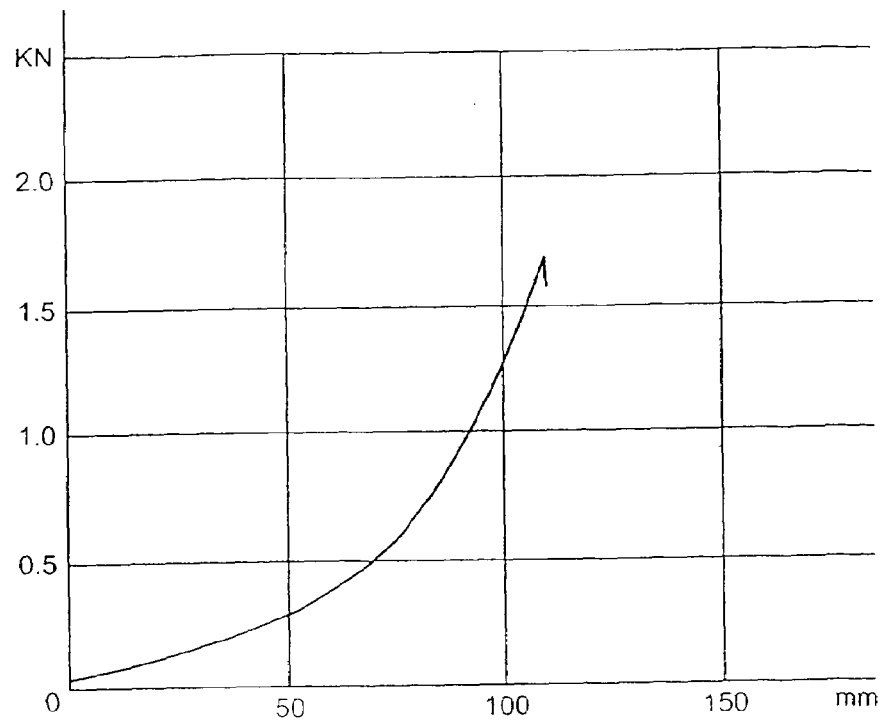
FIG. 17 is a similar view showing force deflection characteristics in the middle part of a seat suspension arrangement in accordance with the invention.
Figure 18:
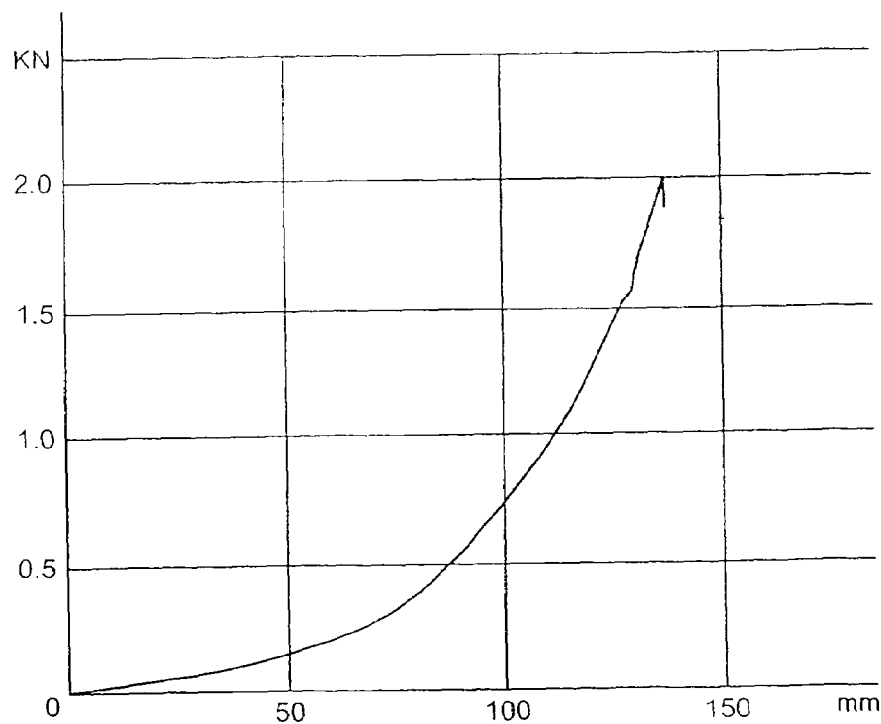
FIG. 18 is a further similar view showing force deflection characteristics in the lower part of a seat suspension arrangement in accordance with the invention.

Corresponding deflection characteristics of such a seat suspension arrangement are shown in the graphs of FIGS. 16–19, wherein FIG. 16 illustrates the deflection characteristic in the upper region of the platform element connected to the seat frame by links 6, FIG. 17 represents the extension characteristic in the middle portion of the platform element connected to the seat frame by means of the links 300, FIG.

Figure 19:
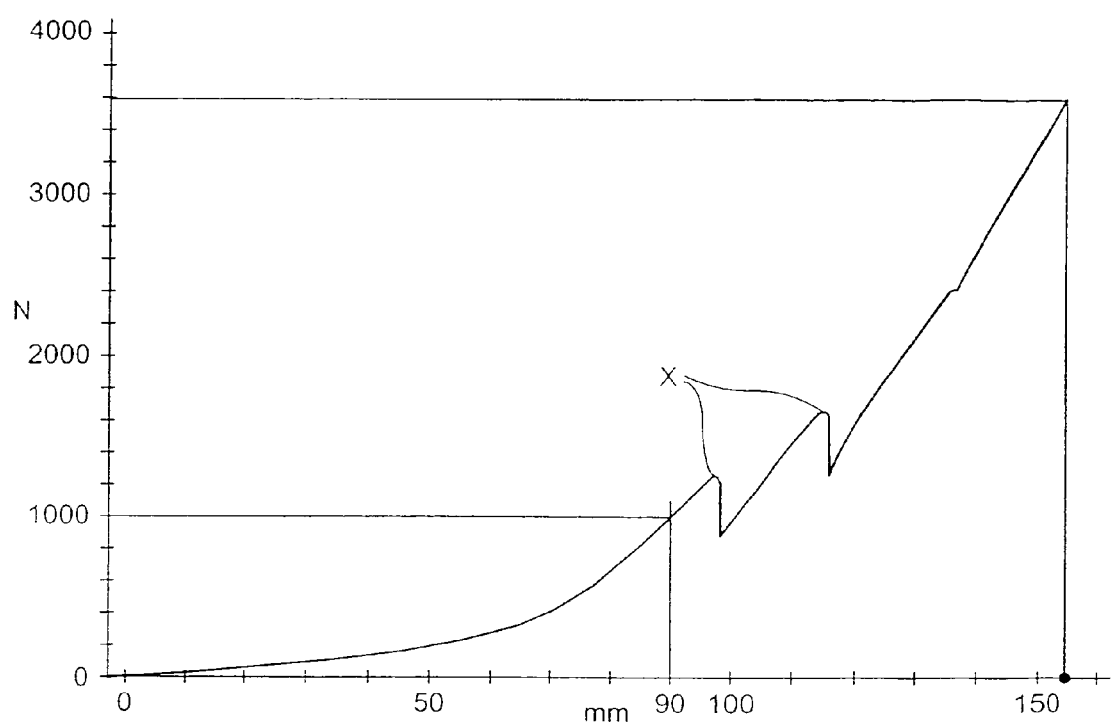
FIG. 19 is a view similar to FIG. 18 but showing force deflection characteristics in the lower part of a suspension arrangement in accordance with the invention, when equipped with link means of the kind shown in FIGS. 10 and 11 of the drawings.

18 represents the extension characteristic of the platform element in the lower region coupled to the seat frame by links 301, and FIG. 19 represents the force deflection characteristic in the region of the platform element linked to the seat i frame by links 302. It will be seen that in FIG. 19 the deflection curve includes discontinuities indicated at the points x, these points representing positions in the curve at which the additional wire links that are shown as 90 in FIGS. 10 and 11 are caused to fail.

What is claimed is:

1. A seat suspension arrangement comprising:
   a seat back platform element having a side margin, wherein the seat back platform element is provides limited resilient extension in normal use up to a maximum normal loading condition; and
   a plurality of collapsible extensible link means connected to the side margin in vertically spaced relationship, the link means substantially restraining the side margin from displacement during normal loading conditions and yielding under abnormal loading conditions, the yielding of the link means being an extension of the link means by plastic deformation of the link means material beyond its yield point, wherein each of the link means increases in length, and not being a resilient extension of the link means in the manner of a spring.

2. A seat suspension arrangement according to claim 1 wherein the seat back platform element is resistant to further resilient extension at the maximum normal loading condition and wherein the abnormal loading conditions exceed the maximum normal loading condition.

3. A seat suspension arrangement according to claim 1 wherein the seat back platform element is further comprised of sinuous wire springs, the sinuous wire springs substantially straightening under the maximum normal loading condition.

4. A seat suspension arrangement according to claim 1 wherein the collapsible extensible link means further comprises a wire link having a loop.

5. A seat suspension arrangement according to claim 4 wherein the loop of the wire link is U-shaped.

6. A seat suspension arrangement according to claim 4 wherein the loop of the wire link is S-shaped.

7. A seat suspension arrangement according to claim 1 wherein the collapsible extensible link means further comprises a wire link wound around an intermediate portion of a U-shaped yoke; the yoke being connected to the side margin through a pair of hooked ends.

8. A seat suspension arrangement according to claim 7 wherein the wire link has a hooked end terminating in spaced relation to the side margin.

9. A seat suspension arrangement according to claim 1 wherein the collapsible extensible link means further comprises a strap looped around the side margin, the strap having a tongue and slot arrangement with the tongue extending through the slot.

10. A seat suspension arrangement according to claim 9 wherein the tongue has a T-shape and the slot has a shape corresponding to the tongue.

11. A seat suspension arrangement according to claim 1 wherein the collapsible extensible link means further comprises a strap with an end looped around the side margin and a curved intermediate section.

12. A seat suspension arrangement according to claim 11 wherein the curved intermediate section of the strap is S-shaped.

13. A scat suspension arrangement according to claim 1 wherein the collapsible extensible link means further comprises a curved intermediate section and an interconnecting link wrapped around the curved intermediate section.

14. A seat suspension arrangement according to claim 13 wherein the curved intermediate section is an S-shaped wire and the interconnecting link is a wire having a pair of ends respectively Looped around ends of the S-shaped wire.

15. A seat suspension arrangement according to any claim 1 wherein the collapsible extensible link means further comprises a clip with a pair of booked ends connected to the side margin and having a base extending longitudinally between the hooked ends, the base having a longitudinal slit.

16. A seat suspension arrangement according to claim 15, further comprising a Bowden cable, the clip being anchored at the seat back platform element and the Bowden cable being anchored at the clip.

17. A seat suspension arrangement according to claim 1 wherein at least one of said collapsible extensible link means provides greater extension than another of said collapsible extensible link means.

18. A seat suspension arrangement according to claim 1 further comprising a plurality of link means connected lo each side margin of the platform element in vertically spaced relation, at least two of said link means connected to each said side margins being collapsible extensible link means, and the arrangement being such that under a given load, lower extensible link means provide a greater extension than upper extensible link means, whereby a lower portion of said platform element collapse away from a seat frame to a greater extent than an upper portion thereof.

19. A seat suspension arrangement comprising:
   a seat back platform element having sinuous wire springs connected between a pair of side margins, the sinuous wire springs substantially straightening under a maximum normal loading condition; and
   a collapsible extensible link means connected to the side margin, the link means substantially restraining the side margin from displacement during normal loading conditions and yielding under abnormal loading conditions, wherein the link means increases in length, the abnormal loading conditions exceeding the maximum normal loading condition.

20. A seat suspension arrangement according to claim 19, including a plurality of link means connected to each side margin of the platform element in vertically spaced relation, at least two of said link means connected to each said side margins being collapsible extensible link means, and the arrangement being such that under given load, lower extensible link means provide a greater extension than upper extensible link means, whereby a lower portion of said platform element collapses away from a seat frame to a greater extent than an upper portion thereof.

21. A seat suspension arrangement comprising:
   a seat back platform element having a pair of side margins and a spring element, the spring element substantially straightening under a maximum normal loading condition; and
   a pair of collapsible extensible link means respectively connected to the pair of side margins, the link means substantially restraining the side margins from displacement during normal loading conditions and yielding under abnormal loading conditions, the abnormal loading conditions exceeding the maximum normal loading condition, wherein the link means is selected according to its ability to absorb energy by extending in plastic deformation under levels of force that are greater than the maximum normal loading condition and wherein each of the link means increases in length.

22. A seat suspension arrangement according to claim 21 wherein the spring element further comprises sinuous wire springs connected between said pair of side margins, the sinuous wire springs substantially straightening under the maximum normal loading condition.

* * * * *

UNITED STATES PATENT AND TRADEMARK OFFICE
CERTIFICATE OF CORRECTION

PATENT NO. : 6,994,399 B2
DATED : February 7, 2006
INVENTOR(S) : Van-Thournout et al.

It is certified that error appears in the above-identified patent and that said Letters Patent is hereby corrected as shown below:

<u>Column 7,</u>
Line 66, delete "A scat suspension" and insert -- A seat suspension --.

<u>Column 8,</u>
Line 6, delete "respectively Looped" and insert -- respectively looped --.
Line 9, delete "a pair of booked ends" and insert -- a pair of hooked ends --.

Signed and Sealed this

Eleventh Day of April, 2006

JON W. DUDAS
*Director of the United States Patent and Trademark Office*